(12) United States Patent
Hadjieleftheriou et al.

(10) Patent No.: US 9,165,018 B2
(45) Date of Patent: Oct. 20, 2015

(54) MANAGING A DISTRIBUTED DATABASE

(71) Applicant: AT&T Intellectual Property I, L.P., Atlanta, GA (US)

(72) Inventors: Marios Hadjieleftheriou, Morristown, NJ (US); Theodore Johnson, New York, NY (US); Vladislav Shkapenyuk, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 227 days.

(21) Appl. No.: 13/706,869

(22) Filed: Dec. 6, 2012

(65) Prior Publication Data

US 2014/0164430 A1    Jun. 12, 2014

(51) Int. Cl.
*G06F 17/30* (2006.01)

(52) U.S. Cl.
CPC ................................. *G06F 17/30283* (2013.01)

(58) Field of Classification Search
CPC ................................................ G06F 17/30283
USPC .................................... 707/756, 769, 770, 771
See application file for complete search history.

(56) References Cited

U.S. PATENT DOCUMENTS

| | | | |
|---|---|---|---|
| 5,079,700 A * | 1/1992 | Kozoll et al. | 715/207 |
| 8,269,604 B2 | 9/2012 | Barragan et al. | |
| 2009/0182779 A1 * | 7/2009 | Johnson | 707/200 |
| 2009/0193423 A1 | 7/2009 | Ruemmler et al. | |
| 2010/0115098 A1 | 5/2010 | De Baer et al. | |
| 2012/0191699 A1 * | 7/2012 | George et al. | 707/718 |
| 2014/0164409 A1 * | 6/2014 | Johnson et al. | 707/756 |

OTHER PUBLICATIONS

Lukasz Golab et al., Scalable Scheduling of Updates in Streaming Data Warehouses, Jun. 2012, vol. 24, 1092-1105.*
Windstream, Colocation Services, "Colocation Services." <http://www.windstreambusiness.com/data-center-solutions/colocation> [Accessed Dec. 5, 2012], all pages.
Savvis, Colocation Hosting, "Colocation Hosting." <http://www.savvis.com/en-us/infrastructure-services/colocation/pages/home.aspx> [Accessed Dec. 5, 2012], all pages.
Golab, Lukasz et al., "Consistency in a Stream Warehouse," <http://www.research.att.com/export/sites/att_labs/techdocs/TD_100239.pdf> Conference on Innovative Data Systems Research (CIDR'11). 2011, all pages.

* cited by examiner

*Primary Examiner* — Jean B Fleurantin
(74) *Attorney, Agent, or Firm* — Hartman & Citrin LLC (57) ABSTRACT

Concepts and technologies are disclosed herein for managing a distributed database. A data management application can obtain a query. The data management application can analyze the query to determine a number of data structures relevant to the query. The data management application also can analyze data stores storing the data structures and move or assign data structures to other data stores within a distributed database. The movement of the data structures within the distributed database can be based upon greedy algorithms for moving data and/or executing queries.

17 Claims, 5 Drawing Sheets

MANAGING A DISTRIBUTED DATABASE

BACKGROUND

This application relates generally to managing data. More specifically, the disclosure provided herein relates to managing a distributed database.

Some communications networks provide various data collection and/or analysis functions. In some cases, data can be collected and/or analyzed for commercialization and/or for internal uses such as improving network and/or network device performance, collecting network or device usage statistics, monitoring network traffic, or the like. As network usage has increased, the amount of data collected and/or analyzed has also increased. Similarly, the speed and/or frequency with which data is collected and/or analyzed has increased with improved network bandwidth and processing capabilities of network reporting, data collection, and/or data analysis systems and devices.

Because of the increased speed and frequency of data reporting, collection, and analysis, some networks and/or network devices may receive data in what may best be described as a data stream, namely, data that streams from a reporting mechanism to a collection/analysis mechanism in a continuous stream of data and/or in frequent bursts of data that are reported several times a second, minute, hour, or day. These collected data may be stored in a distributed data storage device that can include multiple servers and/or other data storage devices. Thus, the reported data may be stored in geographically distributed locations.

When the network devices analyze and/or use data stored in the distributed data storage device, various queries and/or other data operations may be transmitted across the network. Because the analyzed and/or queried data can include streaming data, these queries and/or other operations also may be streamed across the network. Thus, network resources may be consumed to support bandwidth required for these and other communications, which may result in undesirable effects such as network latency, delayed data analysis operations, or the like.

SUMMARY

The present disclosure is directed to managing a distributed database. According to various embodiments, the distributed database can include a number of data stores, one or more of which can store data structures such as records, tables, result sets, and/or temporal partitions of tables or other data structures. The data stored in the data structures can correspond, in various embodiments, to data obtained by the server computer as data streams from any number of data sources. Thus, the data stored in the data structures can correspond, for example, to multiple temporal releases of data such as network statistics, resource utilization figures, and/or other types of data.

A server computer can execute a data management application for managing storage of the data structures in the distributed database and/or for executing queries against the distributed database. According to various embodiments, the data management application can obtain a query and analyze the query to determine data structures involved in the query and/or otherwise relevant to the query. As used herein, data may be considered "relevant to" a query if the data is used or accessed in any way during execution of the query. The data management application can identify a data store having a highest number of relevant data structures and identify data structures missing from this data store. The data management application can copy, relocate, and/or assign the missing data structures to the data store. In some embodiments, the data management application can issue commands to various devices or other entities to copy, relocate, and/or assign the data structures to the data store. The data management application also can execute the query against the data store, which can host the co-located data structures. Thus, embodiments of the concepts and technologies disclosed herein can support co-location of the data structures at a data store of the distributed database using a greedy co-location algorithm.

According to some embodiments, the data management application also can be configured to optimize co-location of data structures within the distributed database based upon a set of queries such as, for example, a query log or the like. The data management application can obtain a query set having two or more queries. The data management application can analyze the queries to determine a query that involves the largest amount of data. The data management application also can analyze the query to determine data structures relevant to the query and/or otherwise relevant to the query. The data management application can identify a data store having a largest amount of available storage space and can store a first data structure relevant to the query at the data store. If additional data structures associated with the query remain for storage, and if storage space remains available at the data store, the data management application can copy, relocate, or assign a next data structure to the data store or issue instructions for copying, relocating, or assigning the next data structure to the data store. These operations can be repeated until co-location of the data structures associated with the query has been optimized, at which time a next query of the query set can be selected and optimized. Thus, embodiments of the concepts and technologies disclosed herein can support co-location of the data structures at a data store of the distributed database using a greedy co-location algorithm and consideration of a number of queries.

According to one aspect of the concepts and technologies disclosed herein, a method is disclosed. The method can include obtaining, at a server computer executing a data management application, a query. The method also can include identifying two or more temporal table partitions relevant to the query, determining two or more data stores that store the two or more temporal table partitions, and identifying a data store that stores a highest number of the two or more temporal table partitions. The method also can include identifying a missing temporal table partition that is not stored at the data store, and issuing a command to copy the missing temporal table partition to the data store.

In some embodiments, the temporal partition can store data associated with a data stream received from a data source. In some embodiments, each of the two or more temporal table partitions can store data associated with a data stream received from a data source. The data associated with the data stream can include network operations data. The missing temporal table partition can include two or more temporal table partitions that are not stored at the data store. In some embodiments, the method also includes executing the query against the data store. In some embodiments, the two or more data stores store data associated with a distributed database. The method also can include obtaining a further query at the server computer, identifying a further two or more temporal table partitions that are relevant to the further query, identifying a further data store having a largest amount of storage space of a further two or more data stores, and issuing a further command to store the further two or more temporal table partitions at the further data store.

According to another aspect, another method is disclosed. The method can include obtaining, at a server computer executing a data management application, a query. The method also can include identifying two or more temporal table partitions that are relevant to the query, and identifying a data store having a largest amount of storage space of two or more data stores. The method also can include issuing a command to store the two or more temporal table partitions at the data store.

In some embodiments, each of the two or more temporal table partitions can store data associated with a data stream received from a data source. The two or more data stores can store data associated with a distributed database. In some embodiments, issuing the command includes issuing a command that future releases of the two or more temporal table partitions are to be stored at the data store. The method also can include determining if a further temporal table partition is to be stored at the data store. In response to a determination that the further temporal table partition is to be stored at the data store, the method can include storing the further temporal table partition at the data store.

In some embodiments, the method includes determining if a further temporal table partition is to be stored at the data store. In response to a determination that the further temporal table partition is to be stored at the data store, the method can include determining if additional storage space exists at the data store. In response to a determination that the additional storage space does not exist, the method can include selecting a further data store having a next largest amount of storage space among the two or more data stores, and issuing a command to store the two or more temporal table partitions at the further data store. The method also can include determining if a further data structure is to be assigned to the data store, and in response to a determination that the further data structure is not to be assigned to the data store, obtaining a further query. The method also can include receiving a further query at the server computer, identifying a further two or more temporal table partitions relevant to the query, determining a further two or more data stores that store the further two or more temporal table partitions, identifying a further data store that stores a highest number of the further two or more temporal table partitions, identifying a missing temporal table partition that is not stored at the further data store, and issuing a further command to copy the missing temporal table partition to the further data store.

According to yet another aspect of the concepts and technologies disclosed herein, a system is disclosed. The system can include a processor and a memory that stores computer-executable instructions. Execution of the computer-executable instructions by the processor can cause the processor to perform operations that can include obtaining a query, identifying two or more temporal table partitions relevant to the query, and determining two or more data stores that store the two or more temporal table partitions. The operations also can include identifying a data store that stores a highest number of the two or more temporal table partitions, identifying a missing temporal table partition that is not stored at the data store, and issuing a command to copy the missing temporal table partition to the data store.

In some embodiments, each of the two or more temporal table partitions stores data associated with a data stream received from a data source. In some embodiments, execution of the computer-executable instructions can cause the processor to perform operations further including executing the query against the data store, where the missing temporal table partition can include two or more temporal table partitions that are not stored at the data store. In some embodiments, execution of the computer-executable instructions can cause the processor to perform operations further including obtaining a further query, identifying a further two or more temporal table partitions that are relevant to the further query, identifying a further data store having a largest amount of storage space of a further two or more data stores, and issuing a further command to store the further two or more temporal table partitions at the further data store.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to managing a distributed database. According to various embodiments, the distributed database can include a number of data stores, one or more of which can store data structures such as records, tables, result sets, temporal partitions of tables or other data structures, and/or other types of data. A server computer can execute a data management application and/or various query tools for managing storage of the data structures in the distributed database and/or for executing queries against the distributed database.

According to various embodiments of the concepts and technologies disclosed herein, the data management application can obtain a query and analyze the query to determine data structures relevant to the query and/or otherwise relevant to the query. The data management application can identify a data store having a highest number of relevant data structures and identify data structures missing from this data store. The data management application can be configured to copy, relocate, and/or assign the missing data structures to the data store, or to issue commands to various devices or other entities to copy, relocate, and/or assign the data structures to the data store. The data management application can execute the query against the data store, which can host the co-located data structures. Thus, some embodiments of the data management application can be configured to co-locate data structures at a data store of a distributed database using a greedy algorithm before executing a query against the data store.

According to some embodiments, the data management application also can be configured to optimize co-location of data structures within the distributed database based upon a set of queries such as, for example, a query log or the like. The data management application can obtain a query set having two or more queries. The data management application can analyze the queries to determine a query that involves a largest amount of data. The data management application can analyze the query to determine data structures relevant to the query and/or otherwise relevant to the query. The data management application can identify a data store having a largest amount of available storage space and can store a first data structure relevant to the query at the data store. If additional data structures associated with the query remain for storage, and if storage space remains available at the data store, the data management application can copy, relocate, or assign a next data structure to the data store or issue instructions for copying, relocating, or assigning the next data structure to the data store. These operations can be repeated until co-location of the data structures associated with the query has been optimized, at which time a next query of the query set can be selected and optimized. By reiterating these operations, some embodiments of the data management application can be configured to co-locate data structures among data stores of a distributed database based upon queries of the query set using a greedy algorithm.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
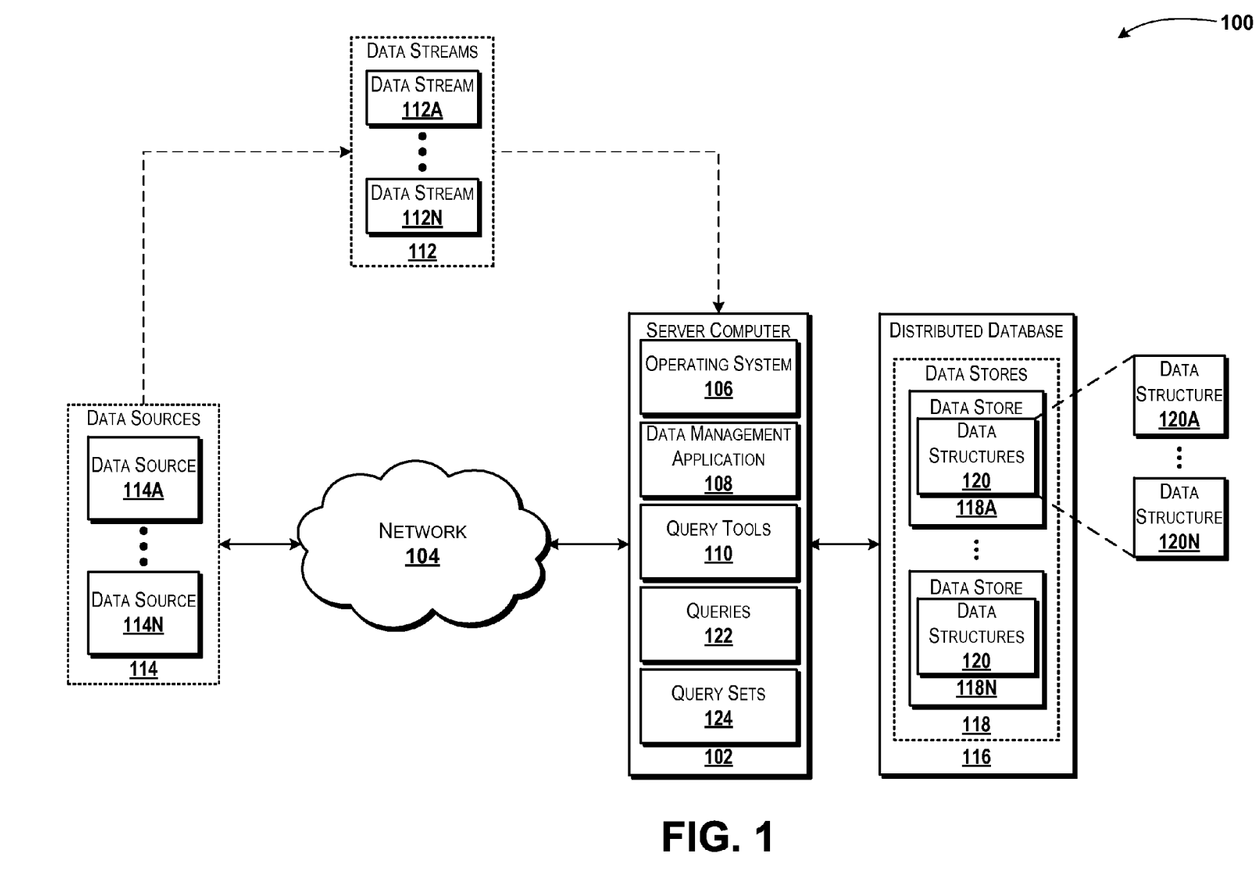
FIG. 1 is a system diagram illustrating an illustrative operating environment for the various embodiments disclosed herein.

Referring now to FIG. 1, aspects of an operating environment 100 for various embodiments of the concepts and technologies disclosed herein for managing a distributed database will be described, according to an illustrative embodiment. The operating environment 100 shown in FIG. 1 includes a server computer 102 operating in communication with and/or as part of a communications network ("network") 104.

While referred to as a "server computer," it should be understood that in various embodiments the functionality of the server computer 102 may be provided by other computing systems such as, for example, desktop computers, laptop computers, other computing systems, combinations thereof, or the like. Similarly, it should be understood that the functionality of the server computer 102 can be provided by a single device, by two similar devices, and/or by two or more dissimilar devices. For purposes of describing the concepts and technologies disclosed herein, the server computer 102 is described herein as a web server or a conventional server computer. It should be understood that the described embodiments are illustrative, and should not be construed as being limiting in any way.

The server computer 102 can execute an operating system 106 and one or more application programs such as, for example, a data management application 108, one or more query tool applications ("query tools") 110, and/or other application programs (not illustrated). The operating system 106 can include a computer program for controlling the operation of the server computer 102. The application programs can include executable programs configured to execute on top of the operating system 106 to provide the functionality described herein for managing a distributed database.

The data management application 108 can be configured to manage storage of data associated with one or more data streams 112A-N (hereinafter collectively and/or generically referred to as "data streams 112"). The data streams 112 can be received or otherwise obtained from one or more data sources 114A-N (hereinafter collectively and/or generically referred to as "data sources 114"). According to various embodiments, the data sources 114 can correspond to one or more data storage devices, server computers, network reporting devices or systems, network analytics devices, combinations thereof, or the like. As such, the data streams 112 can correspond to various types of streaming data including, but not limited to, network statistics, stored data, device output, analytics, performance statistics, device utilization and/or availability information, combinations thereof, or the like. Because the data sources 114 and/or their respective data streams 112 can include almost any type of sources and/or data, it should be understood that these embodiments are illustrative, and should not be construed as being limiting in any way.

The data management application 108 can be configured to obtain the data streams 112. The data management application 108 also can be configured to store data associated with the data streams 112, and/or generate instructions for storing data associated with the data streams 112, in a distributed database 116. The functionality of the distributed database 116 can be provided by one or more databases, server computers, desktop computers, laptop computers, other computing devices, combinations thereof, or the like. In the illustrated embodiment of FIG. 1, the functionality of the distributed database 116 is provided by a number of data stores 118A-N (hereinafter collectively and/or generically referred to as "data stores 118"). According to various embodiments, the data stores 118 can include real or virtual data storage devices. In one contemplated embodiment, for example, the functionality of the data stores 118 is provided by an array of server computers. The array of server computers can be located in a single location, for example, a server farm or data warehouse. According to various embodiments, the data stores 118 are located across distributed geographic locations, and the data stores 118 can communicate with one another via communication links between the data stores 118. It should be understood that this embodiment is illustrative, and should not be construed as being limiting in any way.

In some networks and/or systems, data can be stored at the distributed database 116 and/or its various data stores 118 without consideration of how the data is used and/or accessed. Thus, for example, data may be stored at the distributed database 116, and a controller or other device that can control storage of the data at the distributed database may store the data based upon load of the data stores 118, bandwidth available at any particular time, and/or other considerations. As a result, one instance or set of data stored at a particular data store 118 may be unrelated to other data stored at the data store 118. Furthermore, because some operations on the data may require a number of instances of data from geographically distributed data stores 118, some operations on the data may be delayed and/or result in unnecessary load on network elements.

The data management application 108 can be configured to obtain the data from the data streams 112 and store the data in one or more of the data stores 118 as data structures 120A-N (hereinafter collectively and/or generically referred to as "data structures 120"). The data structures 120 can include data tables, records, temporal partitions of data tables, result sets, and/or other records and/or collections of records. According to various embodiments of the concepts and technologies disclosed herein, the data structures 120 can include temporal partitions of data tables and/or result sets generated based upon one or more temporal partitions of the data tables. It should be understood that these embodiments are illustrative, and should not be construed as being limiting in any way.

According to various embodiments, the data management application 108 can be configured to obtain, store, and/or analyze one or more queries 122 and/or sets of queries ("query sets") 124 such as query logs, standing queries, combinations thereof, or the like. While the queries 122 and the query sets 124 are illustrated as separate entities in FIG. 1, it should be understood that the queries 122 can include queries 122 included in and/or extracted from one or more of the query sets 124, though this is not necessarily the case.

Thus, some embodiments of the concepts and technologies disclosed herein can be used to co-locate data used in a particular query 122 and/or query set 124 embodied as data structures 120 to a single data store 118. If a single data store 118 does not have enough storage space for co-location of all data structures 120 associated with a particular query 122 and/or query set 124, embodiments of the concepts and technologies disclosed herein can be used to co-locate the data structures 120 at least partially and/or to fewer data stores 118. These and other aspects of the concepts and technologies disclosed herein will be described in more detail below.

The data management application 108 can be configured to analyze the queries 122 to identify data structures 120 relevant to the queries 122. For example, the data management application 108 can determine that a particular query 122 may involve a join or union command for two or more tables, temporal partitions of tables, result sets, and/or other types of data structures 120. According to various embodiments, the data structures 120 may be stored at multiple data stores 118. The data management application 108 can be configured to optimize storage of the data associated with the data streams 112 based upon the analysis of the queries 122. The data management application 108 also can be configured to interface with the query tools 110 to optimize storage of the data structures 120 at the data stores 118 during query time, as will be explained in more detail herein.

In particular, the query tools 110 can include various applications and/or modules for obtaining and executing the queries 122 and/or query sets 124 against the distributed database 116. According to various embodiments of the concepts and technologies disclosed herein, the query tools 110 can invoke the data management application 108 at query time and/or the data management application 108 can be configured to obtain and execute the queries 122 without the involvement of the query tools 110.

According to various embodiments, the data management application 108 is configured to obtain a query 122. The query 122 can be obtained from the query tools 110 and/or received from a requestor (not shown in FIG. 1). The data management application 108 can analyze the query 122 to identify data structures 120 relevant to and/or otherwise relevant to the query 122. The data structures 120 relevant to the query 122 can include tables against which the query 122 is executed, result sets generated or relied upon by the query 122, temporal partitions of the tables or other data structures 120 relevant to the query 122, combinations thereof, or the like.

The data management application 108 also can analyze the data stores 118 to determine which of the data stores 118 stores a highest number of data structures 120 relevant to the query 122 being analyzed. The data management application 108 also can identify what data structures 120 that are relevant to the query 122 are not stored or otherwise missing at the data store 118 determined to have the highest number of data structures 120 relevant to the query 122. The data management application 108 can copy the missing data structures 120 to the data store 118 and execute the query 122 against the data store 118. As such, embodiments of the concepts and technologies disclosed herein can support execution of queries 122 against a data store 118 after applying a greedy algorithm to the distributed database 116 to move data between the data stores 118 to co-locate the data at a minimum number of the data stores 118. It should be understood that this embodiment is illustrative, and should not be construed as being limiting in any way.

The data management application 108 also can be configured to assign placement of data associated with the data streams 112 to data structures 120 stored at or by particular data stores 118 to co-locate the data associated with the data streams 112 at a minimum number of the data stores 118. In particular, the data management application 108 can be configured to obtain a set of queries 122 such as, for example, one or more of the query sets 124. The data management application 108 can identify a query 122 of the query set 124 that involves a largest amount of data from the data structures 120 stored at the data stores 118. The data management application 108 also can identify particular data structures 120 relevant to the query 122 that involves the largest amount of data from the data structures 120.

The data management application 108 also can determine a data store 118 of the distributed database 116 that has the most available storage space. The data management application 108 can store a data structure 120 relevant to the query 122 at the data store 118 determined to have the most available storage space. Because various embodiments of the concepts and technologies disclosed herein involve queries 122 of data associated with the data streams 112, it should be understood that the data management application 108 can assign data associated with the data streams 112 to the data store 118 determined to have the most available storage space instead of, or in addition to, storing, relocating, copying, and/or assigning the data structure 120 at the data store 118 as mentioned above.

After storing, relocating, copying, and/or assigning the data structure 120 to the data store 118 determined to have the most available storage space, the data management application 108 can determine if additional data structures 120 remain, e.g., the data management application 108 can determine if the query 122 involves other data structures 120 not yet assigned to, copied to, or stored at the data store 118 determined to have the most available storage space. If the data management application 108 determines that additional data structures 120 remain for assignment, the data management application 108 also can determine if the data store 118 determined to have the most available storage space still has available storage space after copying, moving, or assigning the data structure 120 to the data store 118. If the data store 118 has additional storage space, the data management application 108 can store, copy, and/or assign another data structure 120 to the data store 118. If the data store 118 does not have additional storage space, the data management application 108 can store, copy, and/or assign another data structure 120 to another data store 118, which can be selected on the basis of available data storage space.

It should be understood that the data management application 108 can be configured to store, copy, relocate, and/or assign data structures 120 directly. Thus, the data management application 108 can function, in some embodiments, as a controller of the distributed database 116. In some other embodiments, the data management application 108 can issue one or more commands or requests to other elements, devices, systems, or the like, associated with the network 104 and/or the distributed database 116 to effect storage, copying, relocation, and/or assignment of the data structures 120 to the data stores 118 as described herein. As such, the above embodiments are illustrative and should not be construed as being limiting in any way.

If the data management application 108 determines that additional data structures 120 no longer remain for assignment, the data management application 108 can determine if additional queries 122 remain in the query set 124. If so, the data management application 108 can select a query 122 involving a next largest amount of data and begin optimizing the storage of the data relevant to that query 122 as explained above. As such, it can be appreciated that the data management application 108 can be configured to co-locate data structures 120 at the data stores 118 using a greedy placement algorithm. It should be understood that this embodiment is illustrative, and should not be construed as being limiting in any way.

Although the data management application 108 and the query tools 110 are illustrated as software components of the server computer 102, it should be understood that each of these software components, or combinations thereof, may be embodied as or in stand-alone devices or components thereof operating as part of or in communication with the network 104 and/or the server computer 102. Furthermore, the data management application 108 and the query tools 110 can be combined into a single software component of the server computer 102 and/or another system or device. As such, the illustrated embodiment should be understood as being illustrative of only some contemplated embodiments and should not be construed as being limiting in any way.

FIG. 1 illustrates one server computer 102, one network 104, two data sources 114, and one distributed database 116. It should be understood, however, that various implementations of the operating environment 100 include multiple server computers 102; multiple networks 104; less than two, two, and/or more than two data sources 114; and/or multiple distributed databases 116. As such, the illustrated embodiment should be understood as being illustrative, and should not be construed as being limiting in any way.

Figure 2:
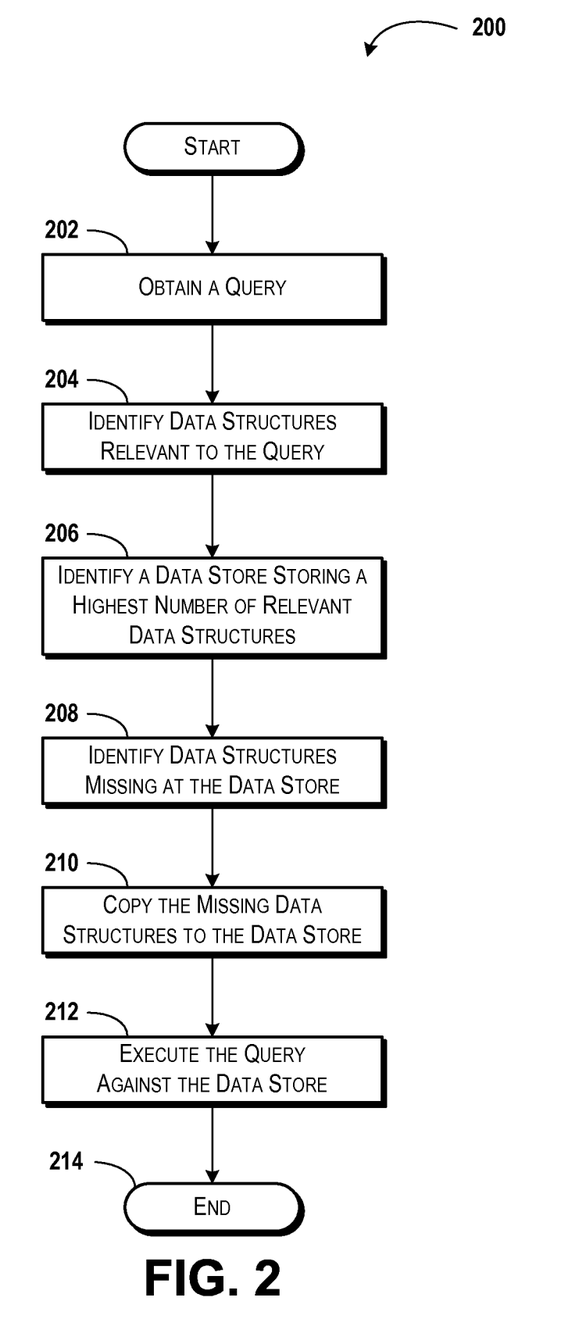
FIG. 2 is a flow diagram showing aspects of a method for co-locating data at a data store to optimize execution of a query against a distributed database, according to an illustrative embodiment.

Turning now to FIG. 2, aspects of a method 200 for co-locating data at a data store 118 to optimize execution of a query 122 against a distributed database 116 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the data management application 108. It should be understood that additional and/or alternative devices and/or network nodes can provide the functionality described herein via execution of one or more modules, applications, and/or other software including, but not limited to, the data management application 108. Thus, the illustrated embodiments are illustrative, and should not be viewed as being limiting in any way.

The method 200 begins at operation 202, wherein the server computer 102 obtains a query 122. The query 122 obtained in operation 202 can include a query 122 received from a requestor, a query 122 included in a query log or other set of queries 122 such as the query set 124, a standing query 122 or other scheduled query 122, and/or another query 122 and/or type of query 122. As can be appreciated from the description of the concepts and technologies disclosed herein, the query 122 can include a query 122 that is to be executed against the distributed database 116. Furthermore, as explained above, the data stored in the distributed database 116 can include data associated with one or more data streams 112 from one or more data sources 114. Because the query 122 can be executed against other data, it should be understood that this embodiment is illustrative, and should not be construed as being limiting in any way.

From operation 202, the method 200 proceeds to operation 204, wherein the server computer 102 identifies one or more data structures 120 that are relevant to the query 122 obtained in operation 202. As used herein, data structures 120 can be determined to be "relevant" to a query 122 if the data structures 120 are relevant to the query 122 and/or referenced, in any way, by the query 122 and/or a device executing the query 122. In particular, the server computer 102 can analyze the query 122 obtained in operation 202 to determine one or more data structures 120 that is or are relevant to the query 122. As explained above, the data structures 120 can include data tables, result sets, records, temporal partitions of data tables, combinations thereof, or the like.

The server computer 102 can identify the data structures 120 relevant to the query 122 in a number of ways. For example, the server computer 102 can identify the data structures 120 based upon the contents of the query 122. For example, if the query 122 includes a union command associated with two tables (e.g., Table A and Table B), the server computer 102 can identify Table A and Table B as being two data structures 120 involved in or otherwise relevant to the query 122. The server computer 102 also can identify the data structures 120 relevant to the query 122. It should be understood that the example of tables is merely illustrative, as the data structures 120 also can include result sets, temporal partitions, records, and/or other types of data. At any rate, the server computer 102 can be configured to identify some or all data structures 120 relevant to the query 122.

From operation 204, the method 200 proceeds to operation 206, wherein the server computer 102 identifies a data store 118 that stores a highest number of the data structures 120 determined to be relevant in operation 204. The server computer 102 can access the data stores 118 to determine which of the data stores 118 stores a highest number of data structures 120. It should be understood that the server computer 102 may or may not identify, in operation 206, a data store 118 that stores the largest data structures 120 in terms of data storage space.

In some embodiments, for example, the server computer 102 can be configured to determine which of the data stores 118 stores a largest number of data structures 120 such as temporal partitions that are relevant to the query 122. Thus, if a first data store 118 stores one table relevant to a query 122 and a second data store 118 stores two temporal partitions relevant to the query 122, the server computer 102 can identify the second data store 118 as having the highest number of data structures 120 relevant to the query 122, even if the size of the table is larger than the combined size of the temporal partitions. Because the server computer 102 can be configured to determine the largest number of data structures 120 based upon additional and/or alternative considerations, it should be understood that this embodiment is illustrative, and should not be construed as being limiting in any way.

From operation 206, the method 200 proceeds to operation 208, wherein the server computer 102 identifies data structures 120 missing at the data store 118 identified in operation 206. The server computer 102 can analyze the data stored at the data store 118 identified in operation 206 as having the highest number of relevant data structures 120 to identify data structures 120 relevant to the query 122 that are not stored at the data store 118. Thus, for example, if a query 122 involves a table "Table A," a result set "Results B," and two temporal partitions "TP1" and "TP2," the server computer can analyze the data store 118 identified in operation 206 to determine which of these data structures 120 is not stored at the data store 118. Because there are other ways in which the server computer 102 can identify data structures 120 missing at the data store 118 identified in operation 206, it should be understood that these embodiments are illustrative, and should not be construed as being limiting in any way.

From operation 208, the method 200 proceeds to operation 210, wherein the server computer 102 copies the missing data structures 120 to the data store 118. In particular, the server computer 102 can copy data structures 120 determined to be missing in operation 208 to the data store 118 determined in operation 206. It should be understood that the server computer 102 may or may not move, assign, and/or copy the data structures 120. In some embodiments, for example, the server computer 102 can issue commands to other devices or systems such as, for example, the data stores 118 and/or the distributed database 116 to move the data structures 120. Because the server computer 102 can be configured to effect moving, assigning, and/or copying of the data structures 120 in various ways, it should be understood that these embodiments are illustrative, and should not be construed as being limiting in any way.

From operation 210, the method 200 proceeds to operation 212, wherein the server computer 102 executes the query 122 obtained in operation 202 against the data store 118. In particular, it can be appreciated from the description of operations 202-210 that the server computer 102 can execute the query 122 against the data store 118 identified in operation 206, and that the data store 118 identified in operation 206 can store all of the data structures 120 relevant to the query 122 after copying all of the data structures 120 over to the data store 118 as described above with reference to operation 210. As such, embodiments of the concepts and technologies disclosed herein can be used to co-locate data structures 120 to a data store 118 using a greedy algorithm, and the query 122 obtained in operation 202 can be executed against a single data store 118 instead of being executed against a number of data stores 118. As such, some embodiments of the concepts and technologies disclosed herein can be used to reduce load on network elements, to reduce communications between the data stores 118, and/or otherwise to optimize storage of data in a distributed database 116.

From operation 212, the method 200 proceeds to operation 214. The method 200 ends at operation 214.

While not illustrated in FIG. 2, the server computer 102 can be configured to continuously and/or periodically perform maintenance operations on the data stores 118. Thus, for example, data structures 120 copied to a data store 118 can periodically be deleted or removed from the data store 118 to create or conserve storage space for other data structures 120 such as data associated with future temporal releases of data associated with a data stream 112, for example. Thus, the server computer 102 can be configured to delete copied, moved, or assigned data structures 120 after passage of a particular amount of time, after running a particular number of queries 122, after a period of inactivity, and/or other amounts of time, occurrences of other actions, combinations thereof, or the like.

Figure 3:
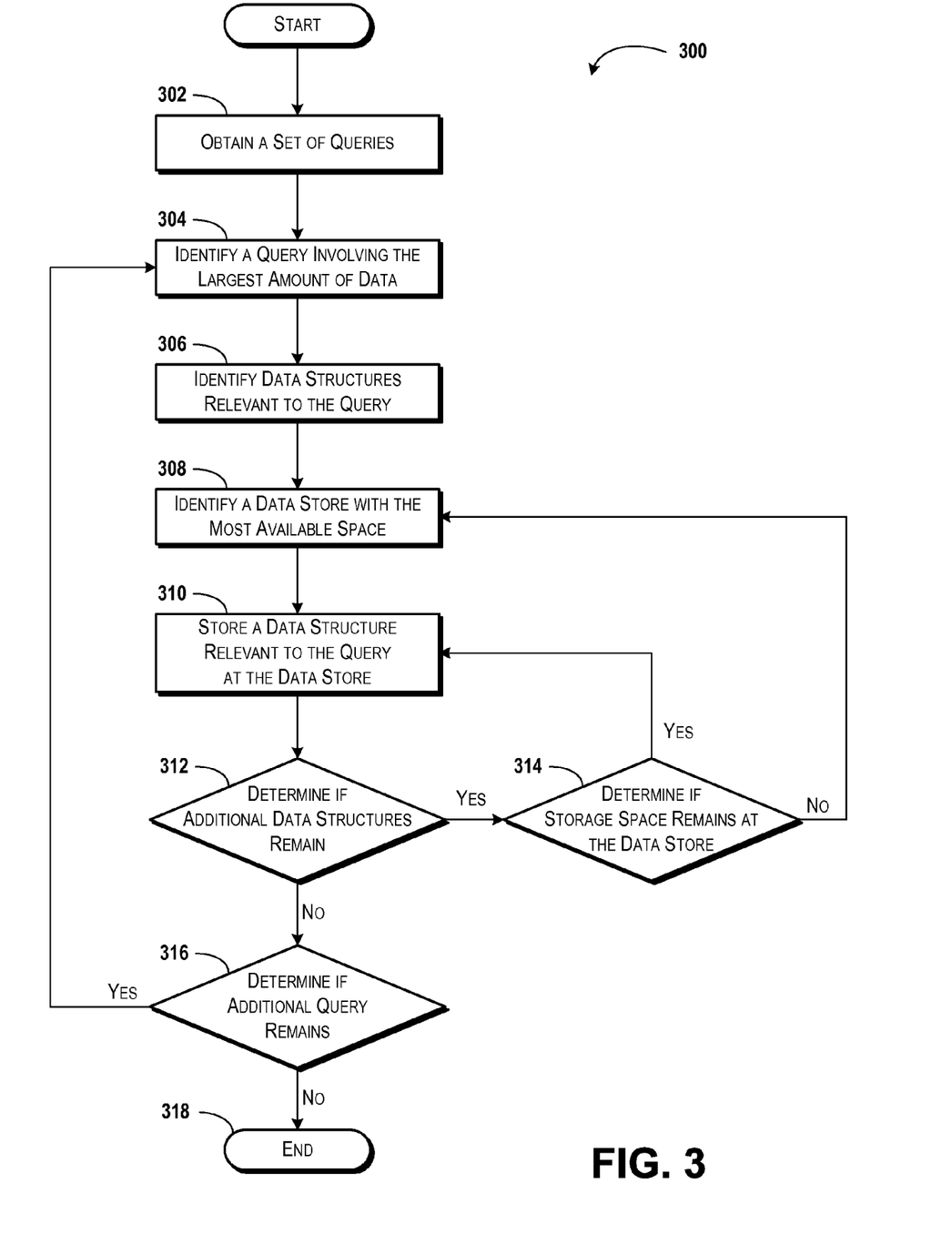
FIG. 3 is a flow diagram showing aspects of a method for co-locating data structures in a distributed database based upon queries, according to another illustrative embodiment.

Turning now to FIG. 3, aspects of a method 300 for co-locating data structures 120 in a distributed database 116 based upon queries 122 will be described in detail, according to an illustrative embodiment. The method 300 begins at operation 302, wherein the server computer 102 obtains a set of queries 122. The set of queries 122 obtained in operation 302 can correspond, for example, to a query log or other set of queries 122 such as the query set 124 shown in FIG. 1. As such, it can be appreciated that the server computer 102 can receive the queries 122, retrieve the queries 122, and/or otherwise obtain the queries 122 from a local or remote data storage device or requestor. For purposes of simplifying the description of the method 300, the set of queries 122 obtained in operation 302 is described herein as a query set 124 that includes a number of queries 122. It should be understood that this embodiment is illustrative, and should not be construed as being limiting in any way.

From operation 302, the method 300 proceeds to operation 304, wherein the server computer 102 identifies, among the query set 124 obtained in operation 302, a query 122 that involves the largest amount of data. The query 122 involving the largest amount of data may be selected first, in some embodiments, because such a query 122 may require a greatest amount of network traffic and/or may cause a greatest amount of delay during execution, though this is not necessarily the case. Thus, the server computer 102 can identify a query 122 included in the query set 124 that is to be the first query 122 optimized in the query set 124. Other queries 122 included in the query set 124 may later be optimized, as will be explained in more detail below.

As explained above with reference to the method 200 illustrated and described with reference to FIG. 2, the query 122 that involves the largest amount of data may be determined based upon the size of the data relevant to the query 122, a number of data structures 120 relevant to the query 122, and/or other considerations. As such, it should be understood that the query 122 determined to involve the largest amount of data may or may not involve the largest amount of data in terms of data storage size. Rather, the largest amount of data may include a highest number of data structures 120 relevant to a query 122, though this is not necessarily the case.

From operation 304, the method 300 proceeds to operation 306, wherein the server computer 102 identifies data structures 120 accessed, involved in, and/or otherwise relevant to the query 122. As explained herein, the data structures 120 relevant to a query can include various types of data including, but not limited to, tables, records, temporal partitions, result sets, combinations thereof, or the like. Identifying the data structures 120 relevant to the query 122 can include analyzing the language of the query 122, analyzing data sources 114 accessed by a query 122, combinations thereof, or the like. Thus, for example, if the query 122 references a result set "Results D" generated by accessing a table "Table Z" and another table "Table X," the server computer 102 can identify the data structures 120 relevant to the query 122 as including Table X, Table Z, and/or Results D. It should be understood that this embodiment is illustrative, and should not be construed as being limiting in any way.

From operation 306, the method 300 proceeds to operation 308, wherein the server computer 102 identifies a data store 118 having the most available storage space. In operation 308, the server computer 102 can access the distributed database 116 to identify a data store 118 having the most available storage space and/or can request, from the distributed database 116 or other systems or devices, an indication as to the data store 118 having the most available storage space. Because the server computer 102 can be configured to determine the data store 118 having the most available storage space in a number of ways, it should be understood that these embodiments are illustrative, and should not be construed as being limiting in any way.

In some embodiments, the data stores 118 and/or the distributed database 116 can be configured to under-report an amount of storage space available at each of the data stores 118. The data stores 118 and/or the distributed database 116 can be configured to under-report the amount of storage space available at the data stores 118 in an effort to prevent the server computer 102 from exceeding the storage capacity of the data stores 118 during data structure 120 assignment, movement, and/or copying as will be more clearly understood with reference to the operations of the method 300 described below. As such, it should be understood that the server computer 102 may determine the data store 118 that has the most available storage space in operation 308, but the server computer 102 may or may not know the actual amount of storage space available and/or the server computer 102 may receive an indication of free storage space that is less than the actual amount of storage space. It should be understood that this embodiment is illustrative, and should not be construed as being limiting in any way.

From operation 308, the method 300 proceeds to operation 310, wherein the server computer 102 stores a data structure 120 relevant to the query 122 on a data store 118. In some embodiments, the data store 118 at which the data structure 120 is stored in operation 310 can correspond to the data store 118 identified in operation 308. As such, it can be appreciated that the server computer 102 can assign one or more of the data structures 120 identified in operation 306 to the data store 118 identified in operation 308.

It should be understood that the data structures 120 can be "stored" at the data store 118 in operation 310 by the server computer 102 assigning the data streams 112 associated with the data structures 120 to the data stores 118. As such, it should be understood that the server computer 102 may or may not copy or move data structures 120 in operation 310. Rather, the server computer 102 may assign future releases of data associated with the data streams 112 to the data store 118 identified in operation 308. Furthermore, as explained above, the server computer 102 can be configured to instruct or request other devices to copy, move, or assign data structures 120. It should be understood that this embodiment is illustrative, and should not be construed as being limiting in any way.

From operation 310, the method 300 proceeds to operation 312, wherein the server computer 102 determines if additional data structures 120 remain. In operation 312, the server computer 102 can determine if each of the data structures 120 identified in operation 306 as being relevant to the query 122 identified in operation 304 has been assigned to the data store 118. In some embodiments, the server computer 102 can maintain a list of data structures 120 identified in operation 306 and determine, in operation 312, if each of these data structures 120 has been assigned to the data store 118. Because other approaches for determining if the data structures 120 have been assigned to the data store 118 are contemplated and are possible, it should be understood that these embodiments are illustrative, and should not be construed as being limiting in any way.

If the server computer 102 determines, in operation 312, that additional data structures 120 remain, the method 300 can proceed to operation 314. In operation 314, the server computer 102 can determine if storage space remains at the data store 118 identified in operation 308. If the server computer 102 determines, in operation 314, that storage space remains at the data store 118 identified in operation 308, the method 300 can return to operation 310, wherein the server computer 102 can store, copy, and/or assign another data structure 120 to the data store 118 identified in operation 308. If the server computer 102 determines, in operation 314, that storage space does not remain at the data store 118 identified in operation 308, the method 300 can return to operation 308, wherein the server computer 102 can identify a data store 118 having the next highest amount of available space and assign a next data structure 120 to that data store 118.

Thus, it can be appreciated that the server computer 102 can be configured to repeat operations 308-314. The server computer 102 can repeat these operations until the server computer 102 determines, in any iteration of operation 312, that additional data structures 120 do not remain. As such, some embodiments of the server computer 102 can, by iterating operations 308-314, optimize co-location of data associated with the query 122 selected in operation 304, though this is not necessarily the case.

If the server computer 102 determines, in operation 312, that additional data structures 120 do not remain to be assigned, the method 300 can proceed to operation 316. In operation 316, the server computer 102 determines if additional queries 122 remain in the set of queries 122 obtained in operation 302. If the server computer 102 determines, in operation 316, that additional queries 122 remain in the set of queries 122 obtained in operation 302, the method 300 can return to operation 304, wherein the server computer 102 can identify a query 122 involving a next largest amount of data.

The server computer 102 can be configured to repeat operations 304-316 until the server computer 102 determines, in any iteration of operation 316, that additional queries 122 do not remain. As such, the server computer 102 can, by iterating operations 304-316, optimize each query 122 in the query set 124 obtained in operation 302. If the server computer 102 determines, in operation 316, that additional queries 122 do not remain in the set of queries 122 obtained in operation 302, the method 300 can proceed to operation 318. The method 300 ends at operation 318.

The above descriptions of the methods 200 and 300 have discussed moving, copying, and/or assigning data streams 112 and/or data structures 120 associated with the data streams 112 between data stores 118. It should be understood, however, that in some instances, the server computer 102 can determine that shipping a result or other type of data structure 120 at query time may be less costly, in terms of bandwidth and/or other computing costs, than relocating, assigning, or copying the data structure 120 to another data store 118 as described herein. As such, some embodiments of the server computer 102 can be configured to consider, as part of the methods 200 and/or 300, if relocating, assigning, and/or copying the data structure 120 to the data store 118 is more costly than not moving, relocating, and/or copying the data structure 120.

Furthermore, the server computer 102 can be configured to perform maintenance operations on the data stores 118 as mentioned above. Thus, for example, data structures 120 copied, relocated, and/or assigned to a data store 118 can periodically be deleted or removed from the data store 118 to create or conserve storage space for other data structures 120 such as data associated with future temporal releases of data associated with a data stream 112, for example. Thus, the server computer 102 can be configured to delete copied, moved, or assigned data structures 120 after passage of a particular amount of time, after running a particular number of queries 122, after a period of inactivity, and/or other amounts of time, numbers of occurrences of other actions, combinations thereof, or the like. Similarly, because various embodiments of the concepts and technologies disclosed herein are used to manage data associated with temporal partitions of tables and/or other temporal releases of data, data located at the data stores 118 may lose their usefulness after a short time. As such, some embodiments of the concepts and technologies disclosed herein can be configured to purge old data from the data stores 118, if desired.

It should be understood that the data structures 120 are temporal tables, consisting of partitions with a temporal identifier that increases over time. In some embodiments, it may be desirable to spread the data structures 120 (partitions of a particular table) across the data stores 118 or other nodes in a cluster. The spreading of the data structures 120 may be performed for purposes of declustering and/or load balancing, though this is not necessarily the case.

In some embodiments of the concepts and technologies disclosed herein, spreading the data structures 120 may be achieved by the data management application 108 by assigning a new location name for one or more (or every) of the data structures 120 (temporal partition of a table). In some embodiments, the location name can correspond to a concatenated name having multiple parts. In one particular implementation, the location name can have two parts, namely, a name of the co-location scheme the table participates in (e.g., "Blue," "Green," or the like), and a partition number (e.g., "Blue__1," "Blue__2," and so on). Furthermore, the tables may be partitioned into, for example, temporal partitions corresponding to five-minute (or other time measure) intervals, and the queries 122 therefore may correlate data from corresponding data structure 120 (temporal partitions), for example A [10:00 AM, 10:05 AM] with B [10:00 AM, 10:05 AM]. It should be understood that this embodiment is illustrative, and should not be construed as being limiting in any way.

In the above example, determining the location name for each data structure 120 may be relatively straight-forward and may guarantee that correlated data structures 120 are co-located, since the data structures 120 may share the same location name. In some embodiments, however, co-locating the data structures 120 may involve additional and/or alternative analysis and/or operations. In particular, some tables may be partitioned differently with respect to other tables. For example, a high volume table may be temporally partitioned into finer-grained partitions relative to low volume tables. Thus, for example, a relatively high volume table may be partitioned into five-minute partitions while a relatively low-volume table may be partitioned into thirty-minute partitions.

Alternatively, two tables partitioned into five-minutes partitions may nonetheless be queried against in time windows that do not necessarily correspond to one another. For example, assume that a first table (TABLE A) and a second table (TABLE B) are both partitioned into five-minutes intervals. When queries 122 are executed against the data structures 120 corresponding to these tables, however, a five-minute partition of TABLE B may be joined with a five-minute partition of A from one hour before. In such an example, identifying which data structure 120 corresponds to a particular location name for each partition of TABLE A and TABLE B may be completed using a function such as, for example, F_A(blue, 1)=[10:00 AM, 10:05 AM], F_B(blue, 1)=[11:00 AM, 11:05 AM]. Thus, relationships between a scheme number and a time range of a table may be highly regular and/or amenable to a simple computation. For example, F_A (blue, x)=[to_datetime(x*5*60), to_datetime((x+1)*5*60)] and F_B(blue, x)=[to_datetime(x*5*60+3600), to_datetime((x+1)*5*60+3600)], where to_datetime converts an integer timestamp to an equivalent datetime value. These and other functions can be stored using a look-up table and/or other data structure by the data management application 108.

In some embodiments, co-location of the data structures 120 may be comparatively more complex when queries 122 correlate data structures 120 and/or data thereof that correspond to tables partitioned using varying time granularities. For example, assume that a first table TABLE A is partitioned into five-minute intervals, and a second table TABLE B is partitioned into one-day intervals. During execution of a query 122, TABLE A and TABLE B may be accessed together. Further assume that in most queries 122, a five-minute interval of TABLE A is joined with a five-minute interval of TABLE B from one hour later. Also, assume that TABLE A is high volume table updated frequently and that TABLE B is a table that is updated once per day, e.g., at the end of the day.

In the above example, if TABLE A and TABLE B are co-located using five-minute partitions, then when TABLE B is updated at the end of the day, it may become necessary to distribute a large number of data structures 120 (partitions) at one time across the cluster that supports TABLE B. As such, some embodiments of the data management application 108 can be configured, in this example, to co-locate using one day intervals (corresponding to a determined time interval at which TABLE B is updated). To support this schedule, the data management application 108 can be configured to locate a large portion of TABLE A on the same server or data store 118, which may adversely affect performance.

To solve the above potential problems, the data management application 108 can be configured to assume that placing a large portion of TABLE A on one data store 118 (e.g., a server) is not a problem. Furthermore, the data management application 108 can be configured to assign TABLE A to a second co-location scheme that additionally partitions TABLE B into five-minute intervals. Yet another solution that can be applied by the data management application 108, is to determine that due to the large temporal mismatch between TABLE A and TABLE B, that no attempt should be made to co-locate data structures 120 associated with these tables. In some embodiments, the server computer 102 can be configured to execute a method for determining if co-location is to be attempted for two related data structures 120. An example method for identifying and resolving temporal mismatches between data structures 120 is illustrated and described below with reference to FIG. 4.

Figure 4:
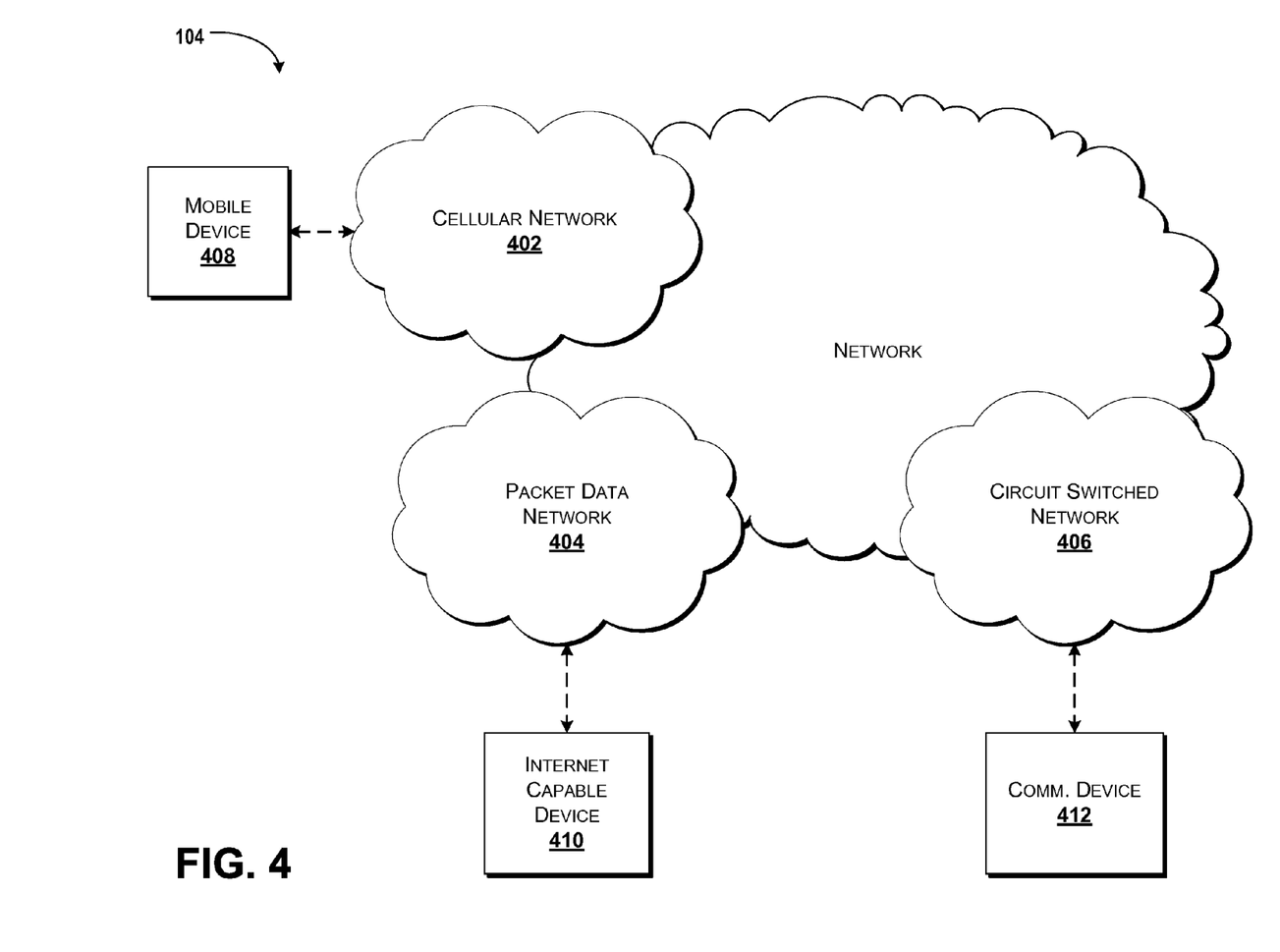
FIG. 4 schematically illustrates a network, according to an illustrative embodiment.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
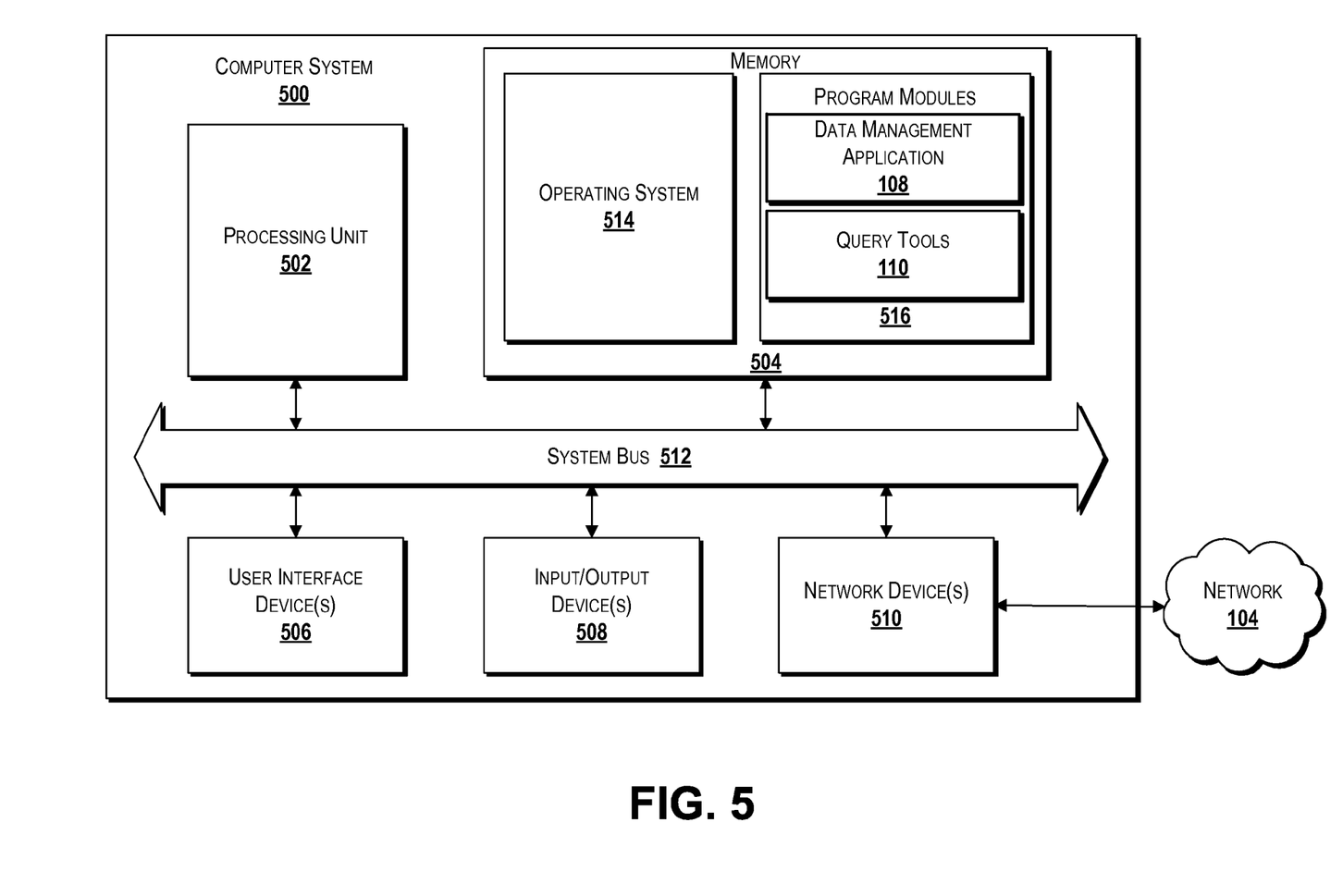
FIG. 5 is a block diagram illustrating an example computer system configured to manage a distributed database, according to some illustrative embodiments.

FIG. 5 is a block diagram illustrating a computer system 500 configured to provide the functionality described herein for a verification service, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the data management application 108, the query tools 110, and/or other program modules. These and/or other programs can be embodied in computer-readable media containing instructions that, when executed by the processing unit 502, perform one or more of the methods 200, 300 described in detail above with respect to FIGS. 2-3. According to embodiments, the program modules 516 may be embodied in hardware, software, firmware, or any combination thereof. Although not shown in FIG. 5, it should be understood that the memory 504 also can be configured to store the data streams 112, the queries 122, the query sets 124, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof, does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for managing a distributed database have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   obtaining, at a server computer executing a data management application, a query;
   identifying, at the server computer, a plurality of temporal table partitions that are relevant to the query;
   determining, at the server computer, a plurality of data stores that store the plurality of temporal table partitions that are relevant to the query;
   identifying, at the server computer and among the plurality of data stores, a data store that stores a highest number of the plurality of temporal table partitions that are relevant to the query;
   identifying, at the server computer, a missing temporal table partition that is not stored at the data store that stores the highest number of the plurality of temporal table partitions that are relevant to the query;
   issuing a command, at the server computer, to copy the missing temporal table partition to the data store so the data store stores each of the plurality of temporal data partitions that are relevant to the query;
   determining, by the server computer, that a further temporal table partition is to be stored at the data store;
   determining, by the server computer, that additional storage space does not exist at the data store;
   selecting, by the server computer, a further data store that has a next largest amount of storage space among the plurality of data stores; and
   issuing, by the server computer, a further command to store the plurality of temporal table partitions at the further data store.

2. The method of claim 1, wherein each of the plurality of temporal table partitions stores data associated with a data stream received from a data source.

3. The method of claim 2, wherein the data stream is associated with network operations data.

4. The method of claim 1, wherein the missing temporal table partition comprises a further plurality of temporal table partitions that are not stored at the data store.

5. The method of claim 1, wherein the plurality of data stores store data associated with a distributed database.

6. The method of claim 5, wherein the command indicates that future releases of the plurality of temporal table partitions are to be stored at multiple data stores of the plurality of data stores.

7. The method of claim 1, further comprising:
obtaining a further query at the server computer;
identifying a further plurality of temporal table partitions that are relevant to the further query;
identifying another data store that has a largest amount of storage space of a further plurality of data stores; and
issuing a command to store the further plurality of temporal table partitions at the other data store.

8. A method comprising:
obtaining, at a server computer executing a data management application, a query;
identifying, at the server computer, a plurality of temporal table partitions that are relevant to the query;
identifying, at the server computer and among a plurality of data stores, a data store that has a largest amount of storage space of the plurality of data stores that store the plurality of temporal table partitions;
issuing a command, at the server computer, to store the plurality of temporal table partitions at the data store;
determining, by the server computer, that a further temporal table partition is to be stored at the data store;
determining, by the server computer, that additional storage space does not exist at the data store;
selecting, by the server computer, a further data store that has a next largest amount of storage space among the plurality of data stores; and
issuing, by the server computer, a further command to store the plurality of temporal table partitions at the further data store.

9. The method of claim 8, wherein each of the plurality of temporal table partitions stores data associated with a data stream received from a data source.

10. The method of claim 8, wherein the plurality of data stores store data associated with a distributed database.

11. The method of claim 8, wherein the command indicates that future releases of the plurality of temporal table partitions are to be stored at the data store.

12. The method of claim 8, further comprising:
determining if a further data structure is to be assigned to the data store; and
in response to a determination that the further data structure is not to be assigned to the data store, obtaining a further query.

13. The method of claim 8, further comprising:
receiving a further query at the server computer;
identifying a further plurality of temporal table partitions that are relevant to the query;
determining a further plurality of data stores that store the further plurality of temporal table partitions;
identifying another data store that stores a highest number of the further plurality of temporal table partitions;
identifying a further missing temporal table partition that is not stored at the other data store; and
issuing another command to copy the further missing temporal table partition to the other data store.

14. A system comprising:
a processor; and
a memory that stores computer-executable instructions that, when executed by the processor, cause the processor to perform operations comprising
obtaining a query,
identifying a plurality of temporal table partitions that are relevant to the query,
determining a plurality of data stores that store the plurality of temporal table partitions that are relevant to the query,
identifying, among the plurality of data stores, a data store that stores a highest number of the plurality of temporal table partitions that are relevant to the query,
identifying a missing temporal table partition that is not stored at the data store that stores the highest number of the plurality of temporal table partitions that are relevant to the query,
issuing a command to copy the missing temporal table partition to the data store so the data store stores each of the plurality of temporal data partitions that are relevant to the query,
determining that a further temporal table partition is to be stored at the data store,
determining that additional storage space does not exist at the data store,
selecting a further data store that has a next largest amount of storage space among the plurality of data stores, and
issuing a further command to store the plurality of temporal table partitions at the further data store.

15. The system of claim 14, wherein each of the plurality of temporal table partitions stores data associated with a data stream received from a data source.

16. The system of claim 14, wherein the computer-executable instructions, when executed by the processor, cause the processor to perform operations further comprising:
executing the query against the data store, wherein the missing temporal table partition comprises a further plurality of temporal table partitions that are not stored at the data store.

17. The system of claim 14, wherein the computer-executable instructions, when executed by the processor, cause the processor to perform operations further comprising:
obtaining a further query;
identifying plurality of temporal table partitions that are relevant to the further query;
identifying another data store that has a largest amount of storage space of a further plurality of data stores; and
issuing another command to store the further plurality of temporal table partitions at the other data store.

* * * * *